United States Patent
Franzi et al.

(10) Patent No.: US 11,977,615 B2
(45) Date of Patent: May 7, 2024

(54) METHOD FOR FACIAL AUTHENTICATION OF A WEARER OF A WATCH

(71) Applicant: Tissot SA, Le Locle (CH)

(72) Inventors: Edoardo Franzi, Cheseaux-Noreaz (CH); Alain-Serge Porret, Neuchatel (CH)

(73) Assignee: Tissot SA, Le Locle (CH)

( * ) Notice: Subject to any disclaimer, the term of this patent is extended or adjusted under 35 U.S.C. 154(b) by 503 days.

(21) Appl. No.: 16/654,190

(22) Filed: Oct. 16, 2019

(65) Prior Publication Data
US 2020/0151307 A1    May 14, 2020

(30) Foreign Application Priority Data

Nov. 9, 2018 (EP) .................................... 18205295

(51) Int. Cl.
*G06F 21/32*    (2013.01)
*G04G 21/02*    (2010.01)
(Continued)

(52) U.S. Cl.
CPC ........... *G06F 21/32* (2013.01); *G04G 21/025* (2013.01); *G06V 40/166* (2022.01);
(Continued)

(58) Field of Classification Search
CPC ...................................................... G06F 21/32
See application file for complete search history.

(56) References Cited

U.S. PATENT DOCUMENTS 7,512,255 B2 * 3/2009 Kakadiaris ........... G06V 40/172
  382/312
10,303,866 B1 * 5/2019 Van Os .................. G06V 40/67
(Continued)

FOREIGN PATENT DOCUMENTS

CN    105095715 A    11/2015
CN    105556529 A    5/2016
(Continued)

OTHER PUBLICATIONS

Office Action dated Jul. 15. 2021 in corresponding Korean Patent Application No. 10-2019-0141761 (with English Translation), 8 pages.
(Continued)

*Primary Examiner* — Simon P Kanaan
(74) *Attorney, Agent, or Firm* — Oblon, McClelland, Maier & Neustadt, L.L.P.

(57) ABSTRACT

A method for facial authentication of a wearer of a watch includes: initiating an authentication process including detecting at least one triggering movement/gesture carried out by the wearer; capturing at least one sequence of images relative to the face of the wearer pivoting from one direction to another in front of the optical sensor; acquiring surface geometric data of the face associated with each image of at least one sequence; generating a three-dimensional model of the face of the wearer from at least one captured sequence of images and from the acquired geometric data; determining an identification index generated based on identification data relative to a plurality of features characteristic of the face of the wearer of the watch detected on the basis of the three-dimensional model, and identifying the wearer if the identification index is greater than a reference identification index.

9 Claims, 2 Drawing Sheets

(51) Int. Cl.
*G06V 40/16* (2022.01)
*G06V 40/40* (2022.01)

(52) U.S. Cl.
CPC ............ *G06V 40/172* (2022.01); *G06V 40/45* (2022.01); *G06F 2221/2133* (2013.01)

(56) References Cited

U.S. PATENT DOCUMENTS

| | | | | |
|---|---|---|---|---|
| 2009/0083850 | A1* | 3/2009 | Fadell ................... | G06F 21/316 |
| 2013/0101182 | A1* | 4/2013 | Frischholz ............. | G06V 40/16 |
| | | | | 382/118 |
| 2013/0286161 | A1* | 10/2013 | Lv .......................... | G06V 20/64 |
| | | | | 348/46 |
| 2014/0123272 | A1* | 5/2014 | Dodge ................ | G06F 21/6281 |
| | | | | 726/17 |
| 2016/0007007 | A1* | 1/2016 | Nevet .................. | G06V 40/103 |
| | | | | 726/19 |
| 2016/0285865 | A1* | 9/2016 | Vielhaber ............... | H04W 4/80 |
| 2017/0076145 | A1* | 3/2017 | Gottemukkula ..... | G06V 40/172 |
| 2019/0042835 | A1* | 2/2019 | Mostafa ................. | G06F 21/32 |
| 2019/0370529 | A1* | 12/2019 | Kumar ................. | G06V 40/164 |
| 2020/0042685 | A1* | 2/2020 | Tussy ..................... | G06V 40/50 |

FOREIGN PATENT DOCUMENTS

| | | |
|---|---|---|
| CN | 105654048 A | 6/2016 |
| CN | 108594995 A | 11/2018 |
| CN | 108764180 A | 11/2018 |
| CN | 108765869 A | 11/2019 |
| EP | 2 993 619 A1 | 3/2016 |
| JP | 2016-51482 A | 4/2016 |
| KR | 10-2016-0070080 A | 6/2016 |

OTHER PUBLICATIONS

European Search Report dated Apr. 15, 2019 in European Application 18205295.1 filed on Nov. 9, 2018 (with English Translation of Categories of Cited Documents).

De Sousa Britto Neto, L, et al., "A Wearable Face Recognition System Built into a Smartwatch and the Bind and Low Vision User", Springer International Publishing, 2015, 15 pages.

Notice of the Reason for Refusal dated Dec. 15, 2020 in Japanese Application No. 2019-195912 (with English language translation), 40 pages.

Notice of Grounds for Rejection dated Jan. 19, 2021 in Korean Patent Application No. 10-2019-0141761 (with English language translation), 12 pages.

Chinese Office Action dated Feb. 10, 2023, issued in Chinese Patent Application No. 201911091928.4 (with English translation).

\* cited by examiner

METHOD FOR FACIAL AUTHENTICATION OF A WEARER OF A WATCH

CROSS-REFERENCE TO RELATED APPLICATION

This application claims priority to European Patent Application No. 18205295.1 filed on Nov. 9, 2018, the entire disclosure of which is hereby incorporated herein by reference.

TECHNICAL FIELD OF THE INVENTION

The present invention relates to a method for facial authentication of a wearer of a watch.

The invention also relates to a watch implementing this method as well as a computer program.

PRIOR ART

A watch comprises a set of functions which can be used by the wearer. Such functions can relate to in addition to the adjustment of the time or of the date, a use of confidential or private data specific to the wearer and useful for accessing personalised services. This data is for example keys, certificates, authentication codes, passwords and personal codes which allow to carry out a secure connection of the watch to a private network of a company, an authentication with secure servers such as a bank server, or a secure messaging service for the sending and the receiving of signed and/or encrypted emails. Consequently, it is thus understood that it is important to be able to secure the access to the use of such functions of the watch.

To do this, methods for authentication are known in the prior art, designed to secure the access to the use of these functions of the watch by the entering of a secret code of the PIN type.

Such authentication methods are not, however, entirely satisfactory since the entering of a secret code by the wearer of the watch can be observed relatively easily by third parties. This mechanism furthermore requires the memorisation by the wearer of the secret code, which can turn out to be off-putting.

It is understood that there is therefore a need to find an alternative solution, in particular which does not have the disadvantages of the prior art.

SUMMARY OF THE INVENTION

One goal of the present invention is therefore to propose a method for facial authentication of a wearer of a watch proposing a strong and robust authentication of the wearer which is also easy to implement.

For this purpose, the invention relates to a method for facial recognition of a wearer of a watch comprising the following steps:
  initiation of the authentication process comprising a substep of detection of at least one triggering movement/gesture carried out by the wearer;
  capture of at least one sequence of images relative to the face of the wearer pivoting from one direction to another in front of the optical sensor;
  acquisition of surface geometric data of the face associated with each image of said at least one sequence;
  generation of a three-dimensional model of the face of the wearer from said at least one captured sequence of images and from said acquired geometric data;
  determination of an identification index generated on the basis of identification data relative to a plurality of features characteristic of the face of the wearer of the watch detected on the basis of the three-dimensional model, and
  identification of the wearer if the identification index is greater than a reference identification index.

In other embodiments:
  the step of initiation comprises a substep of determining that the face of the wearer positioned opposite the optical sensor belongs to a living being;
  the step of capture comprises a substep of acquisition of a plurality of images of all the portions forming the face of the wearer as this face pivots from one direction to another in front of the optical sensor;
  the substep of acquisition comprises a phase of capture of at least two images for each identical portion of the face respectively with two different light exposures: one exposure to visible light and one exposure to infrared light;
  the substep of acquisition comprises a phase of visual and/or sound guiding of the wearer of the watch aiming to maintain:
    the watch in a stable or substantially stable position;
    the face of the wearer in an optimal position relative to the optical sensor in order for it to be comprised in each image of said at least one sequence of images;
  the step of acquisition is carried out simultaneously or substantially simultaneously to the step of capture;
  the step of determination comprises a substep of processing during which the identification data coming from the three-dimensional model is compared to pre-recorded identification data relative to a reference three-dimensional model in order to determine a correspondence between this identification data;
  said at least one triggering movement/gesture is carried out by a portion of the body of the wearer comprising the watch during a positioning of the wearer's face opposite the optical sensor of this watch.

The invention also relates to a watch that is in particular smart, implementing this method, comprising a processing unit, an optical sensor, at least one light source and behavioural and/or physiological sensors, said processing unit being connected to the optical sensor, to said at least one light source and to the behavioural and/or physiological sensors.

The invention also relates to a computer program comprising program code instructions for the execution of the steps of this method when said computer program is executed by the processing unit of a watch.

BRIEF DESCRIPTION OF THE DRAWINGS

Other particularities and advantages will be clear from the description that is given thereof below, for informational purposes and in no way limiting, in reference to the appended drawings, in which.

DETAILED DESCRIPTION OF AN EMBODIMENT OF THE INVENTION

Figure 1:
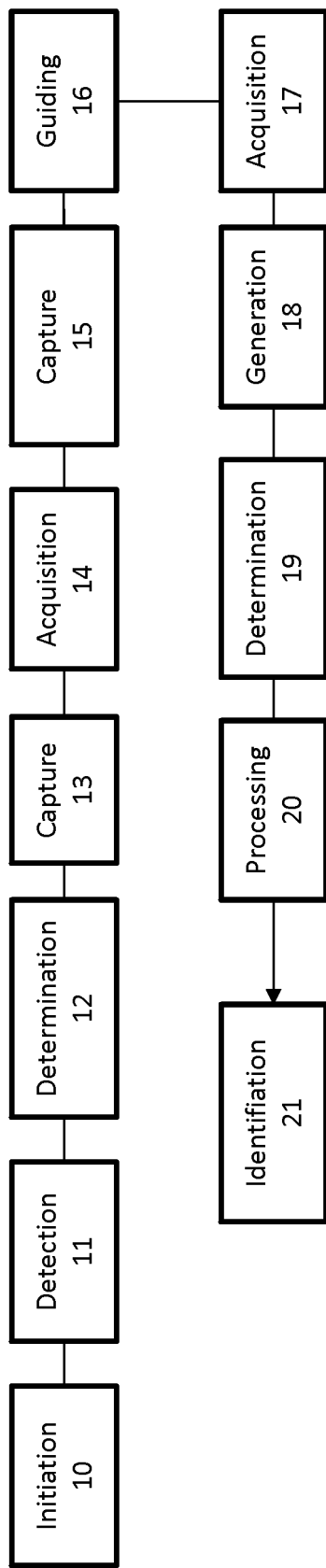
FIG. 1 shows a flowchart relating to a method for facial authentication of a wearer of a watch, according to an embodiment of the invention.

FIG. 1 illustrates a method for facial authentication of a wearer of a watch 1. This method aims to carry out a sure authentication of the wearer of the watch 1 on the basis of a three-dimensional modeling/representation of the wearer's face carried out in particular using an optical sensor 3.

Figure 2:
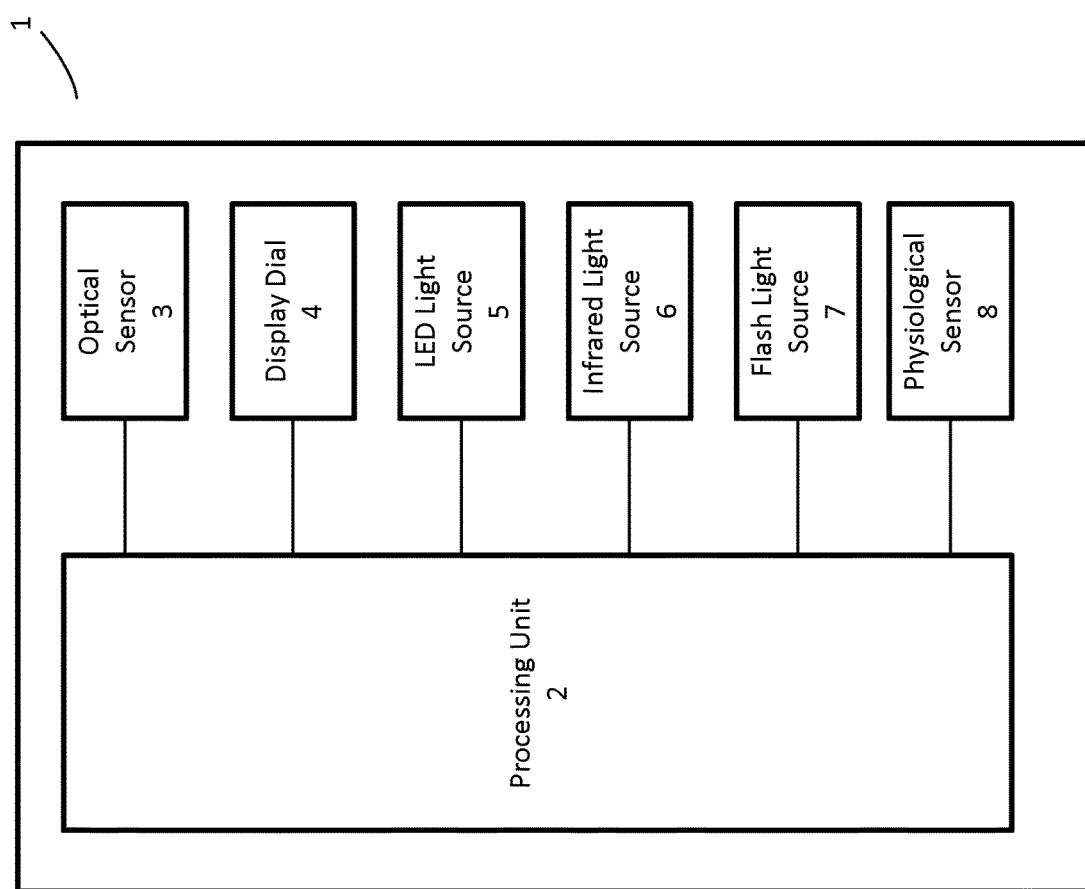
FIG. 2 shows a watch implementing this method, according to the embodiment of the invention.

Such a method is implemented by a watch 1 in particular a smartwatch. Such a watch 1 illustrated in FIG. 2, comprises in a non-exhaustive and non-limiting manner:
- a processing unit 2;
- an optical sensor 3;
- a hybrid display dial 4 provided with a first analogue display component and a second digital and/or alpha-numerical display component;
- a first light source 5 of the light-emitting diode or laser diode type;
- a second light source 6 of the infrared type;
- a third light source 7 designed to be used as a photographic flash;
- a sound interface such as a speaker;
- a communication module;
- a mechanical or electronic movement, and
- behavioural and/or physiological sensors 8.

This processing unit 2 of the watch 1 comprises physical and software resources in particular at least one processor cooperating with memory elements. These memory elements comprise a reference three-dimensional model relative to the face of the wearer, information data relative to features characteristic of the face of the wearer comprised in the reference three-dimensional model, and a reference identification index. Such a processing unit 2 is linked/connected inter alia to the optical sensor 3, to the display dial 4, to the first, second and third light sources 5, 6, 7, to the sound interface, to the communication module, to the movement and to the environmental, behavioural and/or physiological sensors 8.

In this watch 1, the optical sensor 3 called matrix image sensor can for example comprise sensors with CCD technology (charge transfer technology) or with technology called CMOS. Such a sensor comprises a matrix of photosensitive image points (or pixel). Here, this matrix of points is also called "pixel matrix" and comprises N×M unit pixels with excellent sensitivity to light. In one alternative, such a sensor 3 can comprise an organic film sensitive to light in the place of the conventional photosites. Such an optical sensor 3 also comprises an analogue-digital converter. It is noted that this optical sensor 3 is capable of implementing an automatic focusing function, a "zoom" function that is also automatic as well as a function of capturing infrared images. Moreover this optical sensor 3 can operate on the principle of Time of Flight (TOF) in order to measure in real time a scene in three dimensions such as the face of the wearer, in this case the optical sensor 3 can comprise a band-pass filter in the infrared in order to eliminate the superfluous ambient light.

Moreover, the behavioural sensors 8 are capable of measuring all types of behavioural characteristics of the wearer of the watch 1 for example such as the movements or the gestures carried out by the latter. To do this, these behavioural sensors 8 can comprise one or more inertial sensors of the accelerometer, gyroscope or miniature multiaxial gyrometer type such as multiaxial sensors manufactured using MEMS technology, capable of detecting angular speeds and linear accelerations according to a plurality of axes associating accelerometers and/or gyroscopes. With regard to the physiological sensors 8, they are capable of measuring the parameters relative to the functioning of an organism of the wearer such as, for example, the pulse, the impedance of the skin, the blood pressure, the respiratory rate, the respiratory arrhythmia, the skin temperature, the sweat rate, the infrared radiation of the body, the saturation of the blood with oxygen or the blood flow. It is noted that the watch 1 can also comprise environmental sensors specifically adapted for measuring environmental parameters for example such as the temperature, the atmospheric pressure, etc.

Such a method comprises a step of initiation 10 of the process of authentication comprising a substep of detection 11 of at least one triggering movement/gesture carried out by the wearer. This said at least one triggering movement/gesture is carried out by a portion of the body of the wearer comprising the watch 1 during a positioning of the wearer's face opposite the optical sensor 3 of this watch 1. Such a step 10 aims to initiate the authentication process under certain conditions which are met by the implementation of the substeps of detection and of determination 11, 12 of this step 10 explained below.

The substep of detection 11 allows to pre-identify the wearer of the watch 1 by making sure that the wearer is indeed responsible for the process of authentication that is going to be initiated. To do this, when the wearer desires to be authenticated, the wearer then executes at least one predefined movement/gesture, for example, of the wearer's arm and/or of the wearer's wrist provided with the watch 1. This said at least one movement/gesture is then identified by the processing unit 2 after various operations of processing carried out by the latter have been carried out, on at least one piece of measurement data coming from the behavioural sensor having captured this said at least one movement/gesture executed by the wearer. It is noted that these operations involve in particular comparing said at least one piece of measurement data to one or more reference thresholds.

As has been mentioned above, this step 10 also comprises the substep of determination 12 that the face of the wearer positioned opposite the optical sensor 3 belongs to a living being. Such a substep 12 aims to verify that the face positioned opposite the sensor is effectively that of the wearer of the watch who wishes to be authenticated and not a reproduction of the face thereof that can be comprised for example in a photograph, a video or a sculpture. During such a substep 12, the processing unit 2 carries out various operations of processing on at least one piece of physiological measurement data carried out on the face positioned opposite the optical sensor 3 aiming to compare said at least one piece of measurement data to one or more reference thresholds. This measurement can be established on the basis of the emission of infrared radiation coming from this face, a variation in the size of the pupil of at least one eye of this face after exposure to the third light source 6 acting as a photography flash, a detection of a blinking of an eyelid, etc.

It is noted that such a substep of determination 12 can be implemented simultaneously or substantially simultaneously to the substep of detection 11.

Once the step of initiation 10 has been carried out, the method then involves the carrying out of a step of capture 13 of at least one sequence of images relative to the face of the wearer pivoting from one direction to another in front of the optical sensor 3. More precisely, this step 13 comprises a substep of acquisition 14 of a plurality of images of all the portions forming the face of the wearer as this face pivots from one direction to another in front of the optical sensor 3. It is understood here that the pivoting of the face of the wearer in front of the optical sensor 3 is carried out in such a way that all the portions forming the face are captured. This substep 14 comprises a phase of capture 15 of at least two images for each identical portion of the face respectively with two different light exposures: one exposure to visible light and one exposure to infrared light.

In these conditions, this substep 14 allows to obtain at least two sequences of images of the face of the wearer, a first sequence of images of this face, the surface of which is illuminated by visible light and a second sequence of images of the face, the surface of which is illuminated by infrared light.

It is noted that the use of images comprising the face exposed to visible light allows to facilitate the detection of features characteristic of the face relative to the colour or the texture of the skin of the face in these images. The use of images comprising the face exposed to infrared light is advantageous since it is less dependent on the illumination conditions than the use of images of the face captured in visible light.

Such a substep 14 also comprises a phase of visual and/or sound guiding 16 of the wearer of the watch 1 aiming to maintain:
- the watch 1 in a stable or substantially stable position, and/or
- the face of the wearer in an optimal position relative to the optical sensor 3 in order for it to be comprised in each image of said at least one sequence of images.

It is noted that during this substep 14, the processing unit 2 can control the functions of focusing and of "zoom" of the optical sensor 3 in order to contribute to the maintaining of the face of the wearer in each image of each captured sequence of images.

The method then comprises a step of acquisition 17 of surface geometric data of the face associated with each image of said at least one sequence during the implementation of the step of capture of at least one sequence of images relative to the face of the wearer. During this step 17, when the face of the wearer pivots from one direction to another in front of the optical sensor 3, this geometric data is generated for each acquired image comprised in the first and second sequences. More precisely, during the pivoting of the face of the wearer, a beam of structured light of the laser type is thus projected onto each captured portion of the face present in each image of the first and second sequences in such a way as to scan the three-dimensional shapes of each of these portions of the face.

Such an acquisition step 17 is carried out simultaneously or substantially simultaneously to the step of capture 13. The images of the first and second sequences are then archived in the memory elements of the processing unit 2 with the corresponding geometric data which is associated with each of the images.

Then, the method comprises a step of generation 18 of a three-dimensional model of the face of the wearer from said at least one captured sequence of images and from the acquired geometric data. During this step 18, the processing unit 2 implements an algorithm of construction of the three-dimensional model of the face of the wearer on the basis of said at least one sequence of images and the geometric data. Such an algorithm can comprise a phase of pre-treatment of the images of the first and second sequences in order to correct the imperfections that they can contain such as peaks, troughs or the presence of undesirable portions such as the hair or the clothes, or accessories present on the face. This face can thus involve a correction of the imperfections by the elimination of the peaks, the filling of the troughs and the segmentation of the useful portion of the face. To do this a two-dimensional median filter can be applied to each image at the input in order to eliminate the noise. This noise can be in the form of pixels incoherent with their neighbours. Then, this phase can involve the application of a two-dimensional interpolation in order to fill the troughs resulting from the absorption of the laser or of the structured light by dark regions of the face such as the iris, the eyebrows or quite simply when the mouth is open. On the basis of the images obtained for each of these sequences and the corresponding geometric data, the three-dimensional model is generated in particular by the implementation of a process of three-dimensional meshing.

The method then comprises a step of determination 19 of an identification index generated on the basis of identification data relative to a plurality of features characteristic of the face of the wearer of the watch 1 detected on the basis of the three-dimensional model generated. These features characteristic of the face, also called points characteristic of the face, allow to analyse the structure of the face in three dimensions. In other words, these characteristic features allow to interpret the face as a set of characteristic features dispatched in height, width and depth. Such characteristic features can be in a non-limiting and non-exhaustive manner relative:
- to the geometry of the face;
- to the geometry of portions of the surface of the face;
- of the relative positions of the portions of the face;
- to the texture of the skin or of regions of this skin of the face;
- to the hue/colour of the skin or of regions of this skin of the face.

For example, these characteristic features can be wrinkles, a chin, a freckle, scars, lips, corners of the lips, a nose, the tip of the nose, ears, the tip of the ears, the distance between the eyes, the distance between the ridges of the nose, the distance of the chin, etc.

Preferably, such features characteristic of the face taken into account for the determination of the identification index are comprised in regions/zones of the face of the wearer that remain stable during expressions of the face.

During this step 19, a substep of processing 20 is implemented during which the identification data coming from the three-dimensional model is compared to identification data pre-recorded in the memory elements of the unit 2 in order to determine a correspondence between this identification data. According to the result of this comparison, an identification index is thus generated by the processing unit 2. This substep of processing 20 can involve a use of a limited configurable number of pieces of identification data for its implementation. Such a number can be parameterised according to the robustness that it is desired to give this method relative to the quickness of carrying out of such an authentication method.

Then, the method comprises a step identification 21 of the wearer if the identification index is greater than a reference identification index. This reference index allows to verify the correspondence between the identification data of the three-dimensional model of the face of the wearer constructed during the step of generation 18 and the identification data pre-recorded in the memory elements of the processing unit 2 and which is relative to the reference three-dimensional model of the face of the wearer. In other words, when the identification index determined is greater than the reference identification index, the three-dimensional model generated has a significant number of similarities with the reference three-dimensional model of the face of the wearer. Conversely, when the identification index determined is less than or equal to the reference identification index, the number of similarities between the three-dimensional model generated and the reference three-dimensional model is insufficient and consequently the wearer is not identified. In this case, a visual and/or sound message can be broadcast to the wearer informing the wearer that the wearer has not been identified.

The invention also relates to a computer program comprising program code instructions for the execution of the steps 10 to 21 of this method when said computer program is executed by the processing unit 2 of the watch 1.

The invention claimed is:

1. A method for facial authentication of a wearer of a watch comprising:
   initiating an authentication process comprising detecting at least one triggering movement/gesture carried out by the wearer;
   capturing at least one sequence of images relative to the face of the wearer pivoting from one direction to another in front of an optical sensor;
   acquiring surface geometric data of the face associated with each image of said at least one sequence;
   generating a three-dimensional model of the face of the wearer from said at least one captured sequence of images and from said acquired geometric data;
   determining an identification index generated based on identification data relative to a plurality of features characteristic of the face of the wearer of the watch detected on the basis of the three-dimensional model, and
   identifying the wearer when the identification index is greater than a reference identification index based on the three-dimensional model generated having at least a certain number of similarities with a reference three-dimensional model of the face of the wearer,
   wherein the initiating comprises determining that the face of the wearer positioned opposite the optical sensor belongs to a living being based on at least one piece of physiological measurement data, obtained from the face of the wearer, which includes natural emission of infrared radiation radiated from the face of the wearer.

2. The method according to claim 1, wherein the capturing comprises a substep of acquisition of a plurality of images of all the portions forming the face of the wearer as the face pivots from one direction to another in front of the optical sensor.

3. The method according to claim 2, wherein the substep of acquisition comprises a phase of capture of at least two images for each identical portion of the face respectively with two different light exposures: one exposure to visible light and one exposure to infrared light.

4. The method according to claim 2, wherein the substep of acquisition comprises a phase of visual and/or sound guiding of the wearer of the watch aiming to maintain:
   the watch in a stable or substantially stable position, and/or
   the face of the wearer in an optimal position relative to the optical sensor in order for it to be comprised in each image of said at least one sequence of images.

5. The method according to claim 1, wherein the acquiring is carried out simultaneously or substantially simultaneously to the step of capture.

6. The method according to claim 1, wherein the determining comprises processing during which the identification data coming from the three-dimensional model is compared to pre-recorded identification data relative to a reference three-dimensional model in order to determine a correspondence between this identification data.

7. The method according to claim 1, wherein at least one triggering movement/gesture is carried out by a portion of the body of the wearer comprising the watch during a positioning of the wearer's face opposite the optical sensor of this watch.

8. A watch comprising:
   an optical sensor; and
   a processing unit configured to initiate an authentication process comprising detecting, by the optical sensor, at least one triggering movement/gesture carried out by the wearer,
   wherein the optical sensor is configured to capture at least one sequence of images relative to the face of the wearer pivoting from one direction to another in front of the optical sensor, and
   the processing unit is further configured to
      acquire surface geometric data of the face associated with each image of said at least one sequence,
      generate a three-dimensional model of the face of the wearer from said at least one captured sequence of images and from said acquired geometric data,
      determine an identification index generated based on identification data relative to a plurality of features characteristic of the face of the wearer of the watch detected on the basis of the three-dimensional model, and
      identify the wearer when the identification index is greater than a reference identification index based on the three-dimensional model generated having at least a certain number of similarities with a reference three-dimensional model of the face of the wearer,
   wherein processing unit initiates the authentication process by further determining that the face of the wearer positioned opposite the optical sensor belongs to a living being based on at least one piece of physiological measurement data, obtained from the face of the wearer, which includes natural emission of infrared radiation radiated coming from the face of the wearer.

9. A non-transitory computer readable medium comprising program code instructions causing a watch having a processing unit and an optical sensor to execute a method comprising:
   initiating an authentication process comprising detecting at least one triggering movement/gesture carried out by the wearer;
   capturing at least one sequence of images relative to the face of the wearer pivoting from one direction to another in front of the optical sensor;
   acquiring surface geometric data of the face associated with each image of said at least one sequence;
   generating a three-dimensional model of the face of the wearer from said at least one captured sequence of images and from said acquired geometric data;
   determining an identification index generated based on identification data relative to a plurality of features characteristic of the face of the wearer of the watch detected on the basis of the three-dimensional model, and
   identifying the wearer when the identification index is greater than a reference identification index based on the three-dimensional model generated having at least a certain number of similarities with a reference three-dimensional model of the face of the wearer,
   wherein the initiating comprises determining that the face of the wearer positioned opposite the optical sensor belongs to a living being based on at least one piece of physiological measurement data, obtained from the face of the wearer, which includes natural emission of infrared radiation radiated coming from the face of the wearer.

\* \* \* \* \*